(No Model.)

W. WALKER, Jr. & F. R. WILKINS.
PRIMARY BATTERY.

No. 530,867. Patented Dec. 11, 1894.

Witnesses:—
Richard Skerrett
Arthur John Powell

Inventors:—
William Walker Junr
Frank Richard Wilkins

United States Patent Office.

WILLIAM WALKER, JR., OF BIRMINGHAM, AND FRANK RICHARD WILKINS, OF HANDSWORTH, ASSIGNORS OF ONE-THIRD TO JABEZ LONES, OF SMETHWICK, ENGLAND.

PRIMARY BATTERY.

SPECIFICATION forming part of Letters Patent No. 530,867, dated December 11, 1894.

Application filed June 4, 1894. Serial No. 513,475. (No model.) Patented in England December 14, 1892, No. 23,007; in Belgium February 7, 1894, No. 108,431, and in Austria April 27, 1894. No. 1,246.

*To all whom it may concern:*

Be it known that we, WILLIAM WALKER, the younger, of Birmingham, and FRANK RICHARD WILKINS, of Handsworth, England, subjects of the Queen of Great Britain, have invented certain new and useful Improvements in Primary Voltaic Batteries, (for which we have obtained Letters Patent in Great Britain, No. 23,007, dated December 14, 1892; in Belgium, No. 108,431, dated February 7, 1894, and in Austria, No. 1,246, dated April 27, 1894;) and we do hereby declare that the following is a full, clear, and exact description of the invention, which will enable others skilled in the art to which it appertains to make and use the same.

This invention consists of the hereinafter described improvements in those primary voltaic batteries in which the negative element is carbon.

It is well known that single liquid batteries when at work soon become polarized through acquiring a film of hydrogen upon the carbon element which gaseous film impedes the action of the electrolyte or exciting liquid and the electro motive force of the battery rapidly declines.

We so construct or arrange the carbon element that while it is exposed on one side to the action of the electrolyte or exciting liquid it has an opposite side which is in contact with the atmosphere and the hydrogen on that surface of the carbon which is in contact with the electrolyte or exciting liquid combines with the oxygen of the atmosphere in the pores of the carbon and by the removal of the said hydrogen prevents or reduces polarization. The union of the hydrogen and oxygen forms water which accumulates, for the most part, upon the surface of the carbon element which is exposed to the atmosphere, and passes off the same by its own gravity into a receptacle, or saucer, in which the jar is placed and is drawn off, when necessary by a suitable cock.

Figure 1:
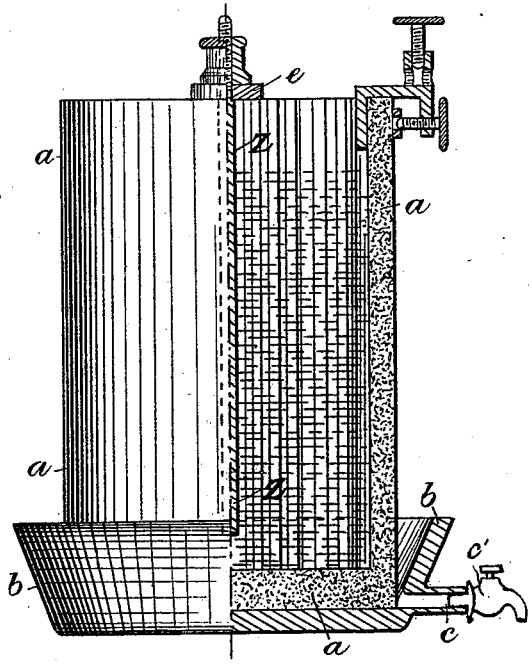
Figure 2:
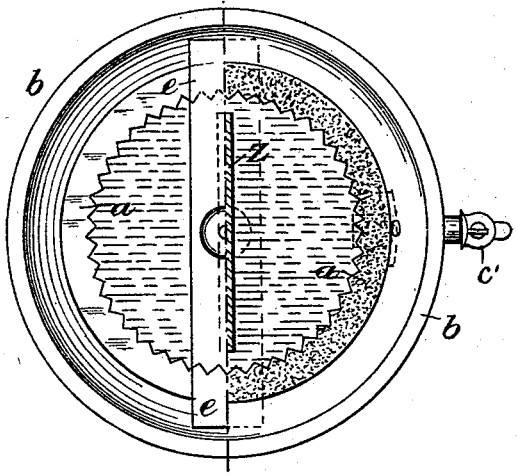

Figure 1 represents partly in elevation and partly in vertical section a primary voltaic battery in which the carbon element is in the form of a pot or vessel for containing the electrolyte and Fig. 2 represents the same partly in plan and partly in horizontal section.

In applying our invention to primary voltaic batteries of the kind represented we omit the usual outer protective coating of the carbon vessel or pot *a* so that the outer surface of the carbon pot *a* is exposed to the atmosphere. We stand the carbon pot *a* in an earthenware saucer or shallow dish *b* so that the liquid which slowly percolates through the carbon may collect in the said saucer or dish. The saucer or dish *b* has a pipe *c* and cock *c'* by which the electrolyte collecting in it runs off. The zinc element Z of the battery is carried by the ebonite or other non-conducting bar *e*.

Having now described our invention, what we claim as new, and desire to secure by Letters Patent, is—

A primary battery having a negative element of carbon forming part of the jar containing the exciting solution, with which one surface of said carbon is in contact while the other is exposed to the atmosphere, and a saucer containing the jar and provided with a discharge.

WILLIAM WALKER, JUNR. [L. S.]
FRANK RICHARD WILKINS. [L. S.]

Witnesses:
RICHARD SKERRETT,
ARTHUR JOHN POWELL.